Nov. 15, 1955     R. REBERNIGG     2,723,854
ROCKET RIDE FOR CHILDREN
Filed April 29, 1953     2 Sheets-Sheet 1

INVENTOR
ROBERT REBERNIGG
BY
ATTORNEY

Nov. 15, 1955  R. REBERNIGG  2,723,854
ROCKET RIDE FOR CHILDREN
Filed April 29, 1953  2 Sheets-Sheet 2
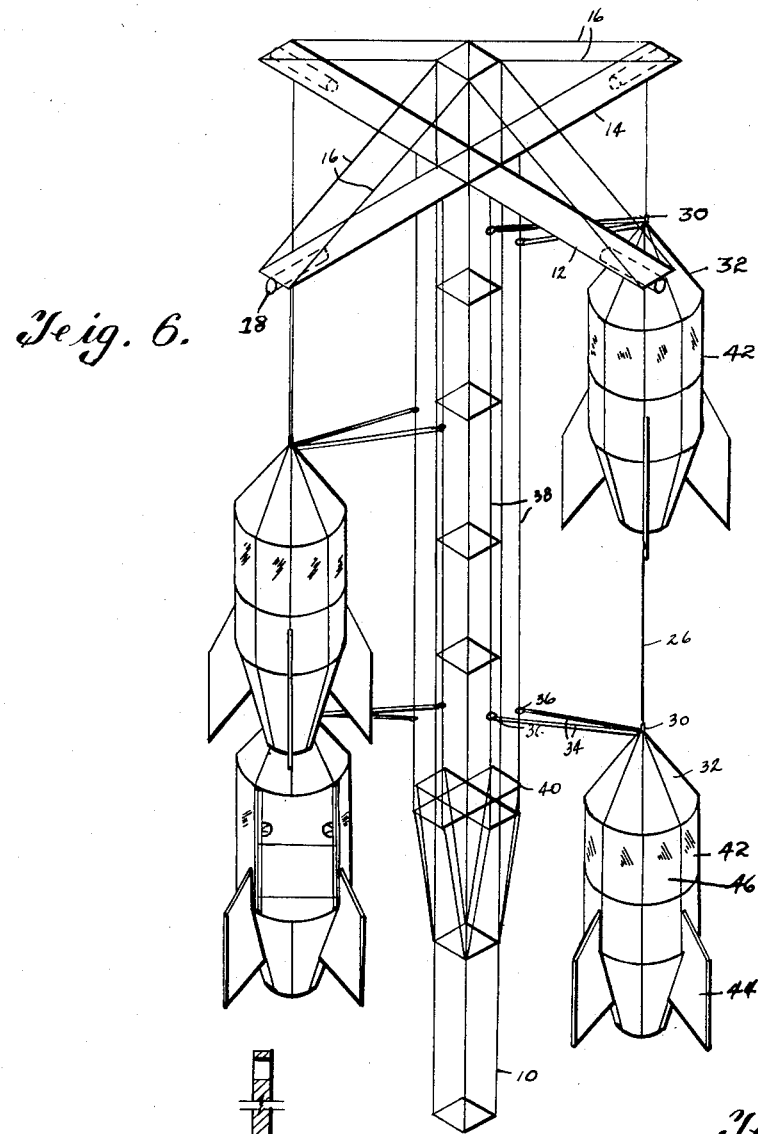
Fig. 6.
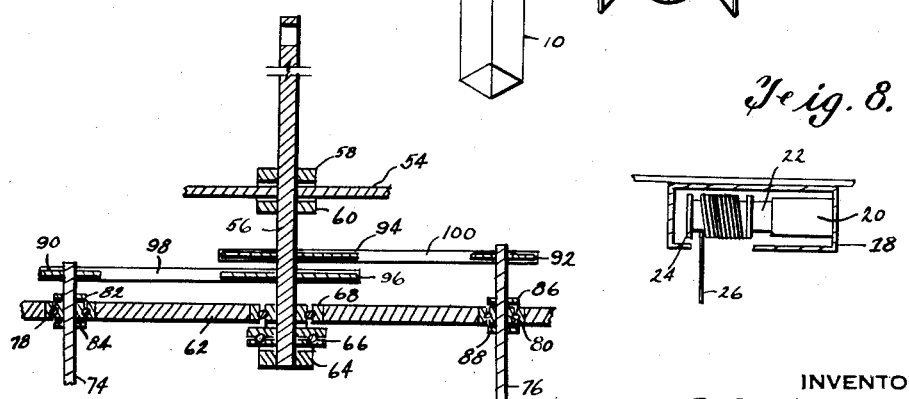
Fig. 7.
Fig. 8.
INVENTOR
ROBERT REBERNIGG
BY
ATTORNEY

United States Patent Office 2,723,854
Patented Nov. 15, 1955

2,723,854

ROCKET RIDE FOR CHILDREN

Robert Rebernigg, Flushing, N. Y.

Application April 29, 1953, Serial No. 351,772

1 Claim. (Cl. 272—7)

This invention relates to a rocket ride for children.

There are two aspects to the rocket ride herein described and claimed. The first relates to vertical ascent and descent and this movement is controlled by the operator of the device through the instrumentality of one or more electric motors and attendant cables, pulleys and the like. The other aspect of this rocket ride relates to angular movement or rotational movement about the vertical axis of each rocket and this movement is not only controlled but also caused by the children riding within the rockets.

In the preferred form of this invention, each rocket is individually controlled both by the operator of the entire device and also by the child or children within the individual rocket. Thus, a typical installation may include four rockets and should only one or two of them be occupied at any given time, the other rockets could remain inoperative while the occupied rockets would function in the manner described. It would be possible to cause each individual rocket to engage in rotary movement simultaneously with its vertical movement in either direction and the operation of any one rocket would be entirely independent of and without influence upon the operation of the other rockets.

The principal object of this invention is the provision of a rocket ride for children, wherein the rockets are movable both vertically and rotationally, the vertical movement being both upward and downward and the rotational movement being either clockwise or counter-clockwise, depending upon the will of the occupants of the individual rockets. An important feature of this invention is its safety characteristics since the vertical movement is intended to be relatively slow both during ascent and descent of the individual rockets. The rotational movement would also necessarily be relatively slow since such movement would be effected manually by the children themselves and they would lack the strength to rotate the rockets at any speed which would even remotely approach a dangerous point.

Another important object of this invention is the provision of a rocket ride for children which is relatively simple and inexpensive in its structural and operative parts and which is relatively simple to operate both by the operator of the entire device and by the children who ride in it.

A further object of this invention is the provision of a rocket ride for children wherein the children themselves engage and participate in the operation of the individual rockets and control their rotational movement. The children would be able to determine in which direction the rockets would rotate and they would also determine the speed of rotation.

A preferred form of this invention is shown in the accompanying drawings in which:

Fig. 6 is a perspective view of the entire device showing four rockets supported thereby.

Fig. 7 is a fragmentary sectional view showing the means for manual rotation of the rockets.

Fig. 8 is a schematic view of the hoist mechanism for raising and lowering the individual rockets.

Figure 1:
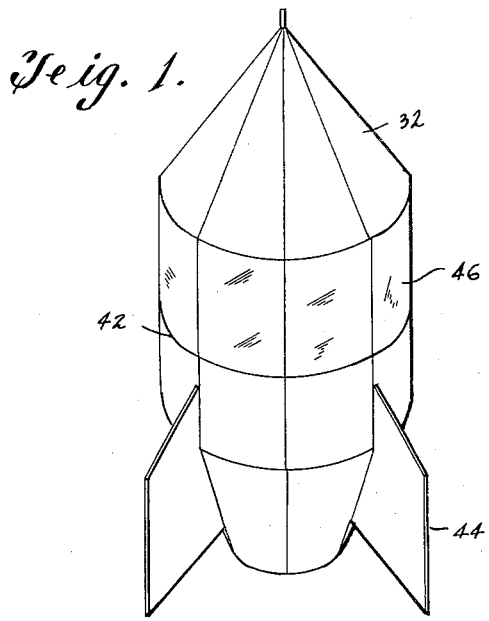
Fig. 1 is a perspective view of one of the rockets or rocket cars.

It will be seen in Fig. 6 that a vertical framework 10 is provided which supports all of the operative parts of the rocket ride herein claimed. This framework may be of any conventional construction and it should be mounted on a firm support, such as a concrete block or pier formed in the ground. At the top of framework 10 are two cross arms 12 and 14 respectively which are supported in horizontal positions by means of guy wires or cables 16, said guy wires or cables being secured at their upper ends to the upper end of framework 10 and at their lower ends to the ends of cross arms 12 and 14.

On each end of each of the two cross arms is a winch 18 which consists of an electric motor 20 with speed reducing gears 22 and a drum 24 driven by said motor through said gears. Wound upon the drum in each of the four winches 18 is a wire cable 26. The construction of the motor, speed reducing gears and drum is intended to be entirely conventional and of the type conventionally used in hoisting and winch mechanisms. The motor may be reversible in order to wind the cable 26 upon the drum 24 and also to play the cable off the drum and in such manner effecting and controlling the ascent and descent of the rocket cars. If desired, a conventional clutch and reversing gear may be incorporated into the gear box 22 in order to provide for both ascent and descent of the rocket cars with the motor 20 rotating in the same direction at all times.

It will be seen that there are four cables 26 emanating from the winches at the ends of the two cross arms 12 and 14. Each cable 26 is secured on its free end to a ring 30 at the top of hood 32. Hood 32 is stationary in the sense that it does not rotate. It is, however, vertically movable in either direction depending upon the direction of movement of cable 26. To insure against angular movement of hoods 32, brackets 34 are provided. At one end these brackets are fixedly secured to the upper end of hoods 32. At the opposite ends these brackets 34 are provided with rings 36 which ride upon vertical cables 38 extending along the sides of the vertical framework 10 from the two cross arms 12 and 14 to a fixed bracket 40 secured to said vertical framework 10. These brackets 34 do not interfere with the vertical movement of the rockets either upwardly or downwardly but they do prevent rotational movement of hoods 32 for a reason which will shortly become apparent.

Suspended below each hood 32 is a rocket car 42 which is provided with fins 44, windows 46 and doors 48. These rocket cars may be made in any desirable size and shape and for purposes of illustration they are shown to be intended for occupancy and operation by two children although one alone would be capable of operating each individual rocket car. Each rocket car is provided with a floor 50 on which the children would stand or rest their feet and it would also be provided with a seat 52 upon which the children would be able to sit.

Figure 2:
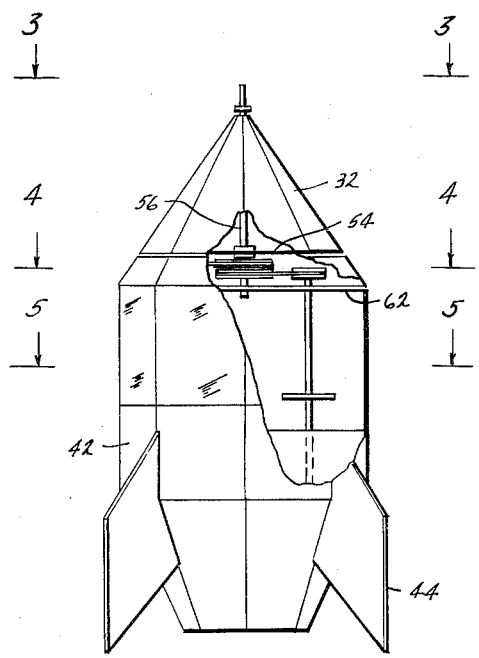
Fig. 2 is a side view thereof with a wall broken away to expose some of the operative parts of the device and more particularly the parts which cause rotational movement of the rocket.
Figure 3:
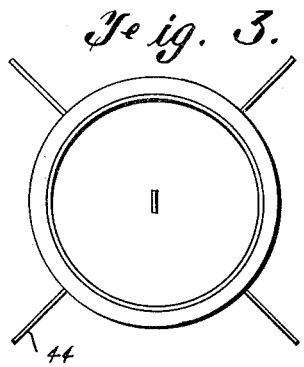
Fig. 3 is a top view of the rocket showing the stationary part from which the rotary part is suspended, said view being in the direction of arrows 3, 3 of Fig. 2.
Figure 4:
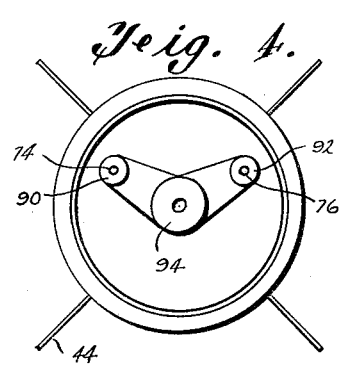
Fig. 4 is a sectional view on the lnie 4—4 of Fig. 2.
Figure 5:
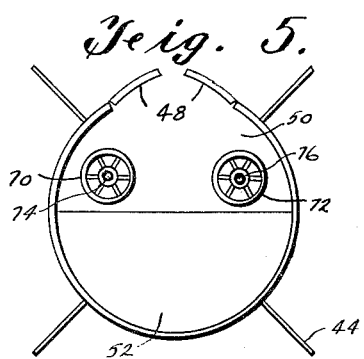
Fig. 5 is another section taken on the line 5—5 of Fig. 2.

Referring now to Figs. 2 and 7, it will be seen that each hood 32 is provided with a bottom wall or frame 54 which supports a vertically extending shaft 56. This shaft is keyed to the bottom wall or frame 54 and it is also locked thereto by means of nuts 58 and 60 respectively in order to prevent any movement of the shaft relative to said bottom wall or frame, either axially or angularly of said shaft. The bottom end of shaft 56 projects through an opening in the top wall 62 of the rocket or rocket car and it will be seen that the shaft carries at its lower end a nut 64. Between the nut 64 and top wall 62 of the rocket car is a thrust bearing 66 which is mounted on said shaft 56. Also mounted on shaft 56 is a bearing 68 which is interposed between said shaft and top wall 62 of the rocket car. It will be observed that these two bearings enable the rocket car to be supported on said shaft 56 and to be rotatably movable relative thereto.

Two wheels 70 and 72 respectively are supported on vertical shafts 74 and 76 respectively within each rocket car. These shafts are rotatably supported between the floor 50 of the rocket car and its top wall 62 and it will be seen in Fig. 7 that these shafts are supported by bearings 78 and 80 respectively in the top wall 62 and corresponding bearings in the floor 50. Collars 82 and 84 prevent vertical movement of shaft 74 and corresponding collars 86 and 88 prevent vertical movement of shaft 76. At the top end of shaft 74 is a sprocket wheel 90 and a corresponding sprocket wheel 92 is secured to the top end of shaft 76. Two sprocket wheels 94 and 96 are secured to shaft 56 and a sprocket chain 98 connects the two sprocket wheels 90 and 96 and a similar sprocket chain 100 connects the two sprocket wheels 92 and 94.

It will be observed from the foregoing that when wheels 70 and 72 or either of them are rotated by the children riding in the rocket car, the rocket car will be caused to rotate around shaft 56. This rotation of the rocket car may take place either in clockwise or counter-clockwise direction, depending upon the direction of rotation of wheels 70 and 72 and such rotation of the rocket car takes places independently of the vertical movement thereof.

The foregoing is illustrative of a preferred form of this invention and it will clearly be understood that this preferred form may be modified and other forms may be provided within the board spirit of the invention and the broad scope of the claim. For example, the invention is not limited to a kiddy ride in which four rocket cars are provided. There may be four cars or fewer than four cars or a larger number than four cars. Similarly, the specific construction of the vertical collar which supports the cross arms and the rocket cars is not critical and any conventional framework construction will suffice for the purposes of this invention. Also, the specific shape and appearance of the rocket cars as illustrated in the drawing are purely illustrative and it may be found desirable to provide the rocket cars with a different shape and appearance.

I claim:

A rocket ride of the character described, comprising a vertical supportnig frame, laterally extending arms supported on said frame, a winch mounted on each said arm, a cable connected to said winch, a rocket car supported by said cable, whereby the rocket car is vertically movable in both directions by means of said cable upon operation of the winch, said rocket car comprising an upper unit and a lower unit, the upper unit being secured to the cable, a vertical shaft fixed to the upper unit and projecting downwardly therefrom, the lower unit being rotatably supported on said vertical shaft for rotary movement relative to said shaft and relative to the upper unit, vertically extending guides provided on said vertical supporting frame for each said rocket car, braces connected at one end to the upper unit of said rocket car and slidably connected at the opposite end to said guides, whereby the upper unit is prevented from engaging in angular movement about a vertical axis while it is moving vertically during operation of the winch, a seat mounted in the lower unit of each said rocket car, a control wheel rotatably mounted in said lower unit adjacent said seat, and gear and chain means interconnecting said control wheel and said vertical shaft, whereby a rider sitting on said seat and turning said control wheel is able to cause the lower rocket car unit to rotate about the vertical shaft relative to the upper rocket car unit.

References Cited in the file of this patent

UNITED STATES PATENTS

| | | |
|---|---|---|
| 1,491,938 | Wennerstrom | Apr. 29, 1924 |
| 1,529,512 | Smerechanski | Mar. 10, 1925 |
| 2,264,919 | Strong | Dec. 2, 1941 |
| 2,374,627 | Strong | Apr. 24, 1945 |
| 2,516,049 | Evans | July 18, 1950 |